(No Model.)  4 Sheets—Sheet 1.
N. TESLA.
ELECTRO MAGNETIC MOTOR.
No. 381,968.  Patented May 1, 1888.

Figure 1:
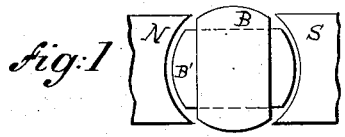
Figure 2:
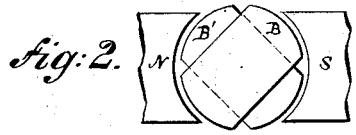
Figure 3:
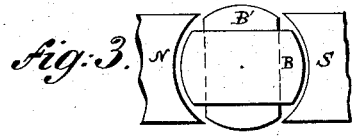
Figure 4:
Figure 5:
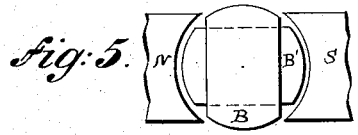
Figure 6:
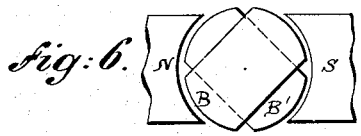
Figure 7:
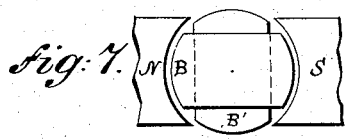
Figure 8:
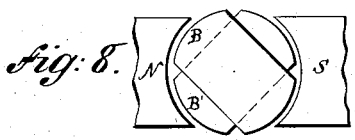

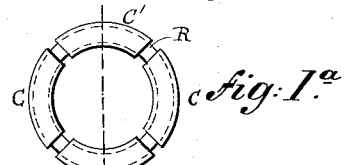 *Fig. 1.ª*
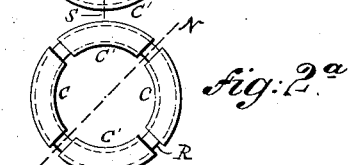 *Fig. 2.ª*
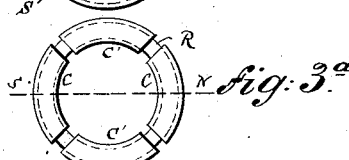 *Fig. 3.ª*
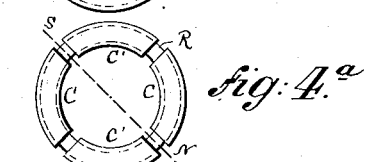 *Fig. 4.ª*
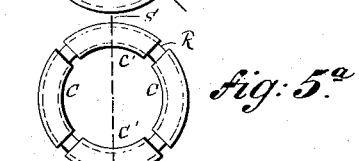 *Fig. 5.ª*
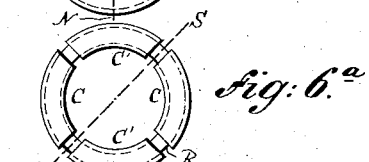 *Fig. 6.ª*
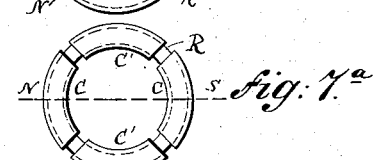 *Fig. 7.ª*
 *Fig. 8.ª*
WITNESSES:
Frank E. Hartley
Frank B. Murphy
INVENTOR.
Nikola Tesla,
BY
Duncan, Curtis & Page
ATTORNEYS.

(No Model.) 4 Sheets—Sheet 2.

N. TESLA.
ELECTRO MAGNETIC MOTOR.

No. 381,968. Patented May 1, 1888.

WITNESSES:
Frank E. Hartley.
Frank B. Murphy.

INVENTOR:
Nikola Tesla,
BY
Duncan, Curtis & Page
ATTORNEYS.

(No Model.) 4 Sheets—Sheet 3.
N. TESLA.
ELECTRO MAGNETIC MOTOR.
No. 381,968. Patented May 1, 1888.
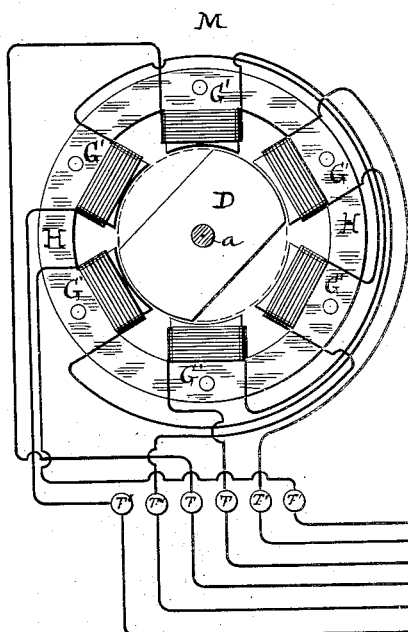
Fig. 13.
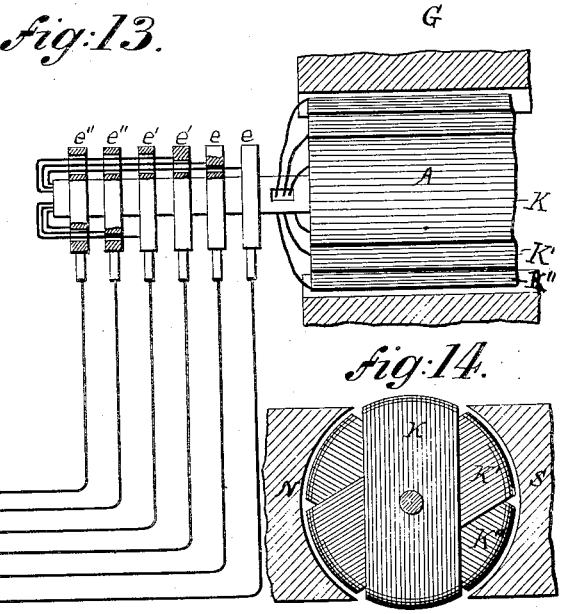
Fig. 14.
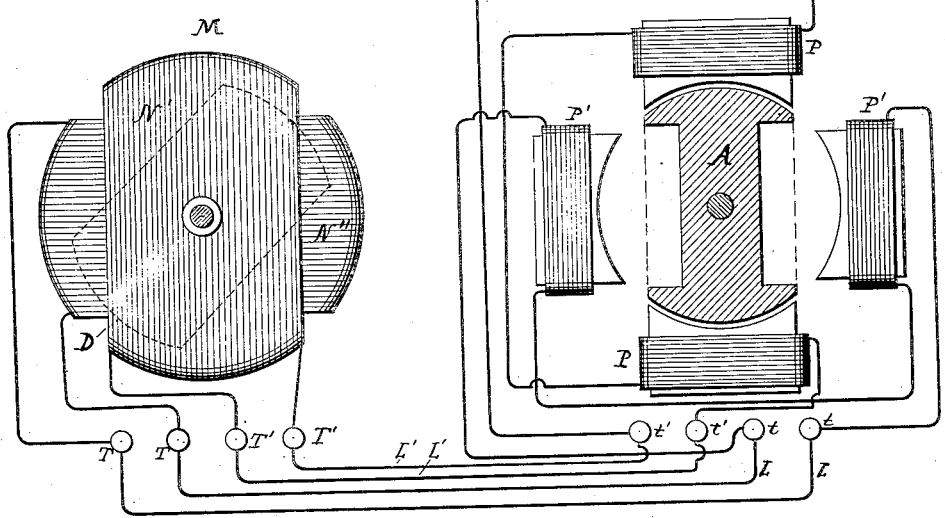
Fig. 15.
Fig. 16.
WITNESSES:
Frank E. Hartley.
Frank B. Murphy.
INVENTOR.
Nikola Tesla.
BY
Duncan, Curtis & Page
ATTORNEYS.

(No Model.) 4 Sheets—Sheet 4.
N. TESLA.
ELECTRO MAGNETIC MOTOR.
No. 381,968. Patented May 1, 1888.
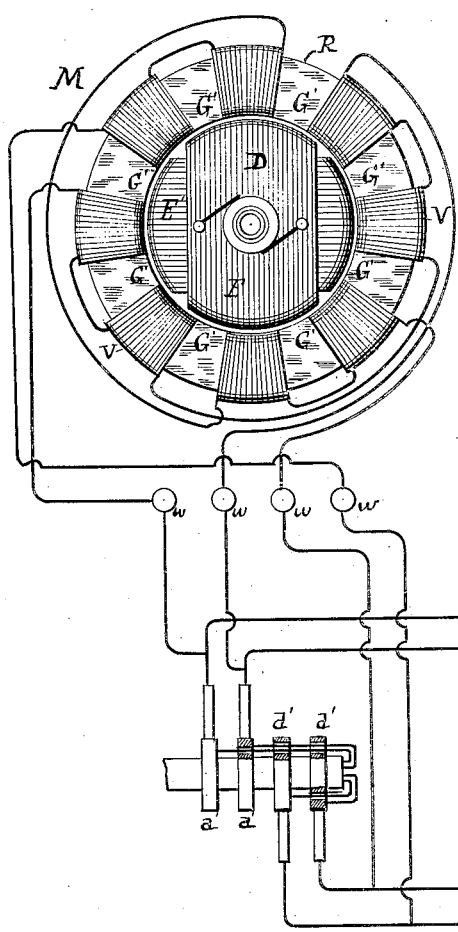
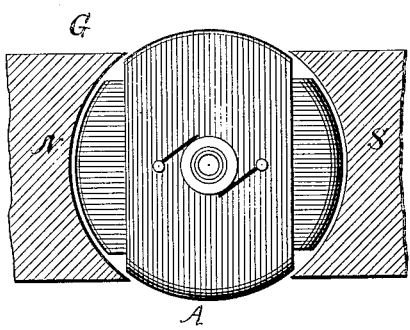
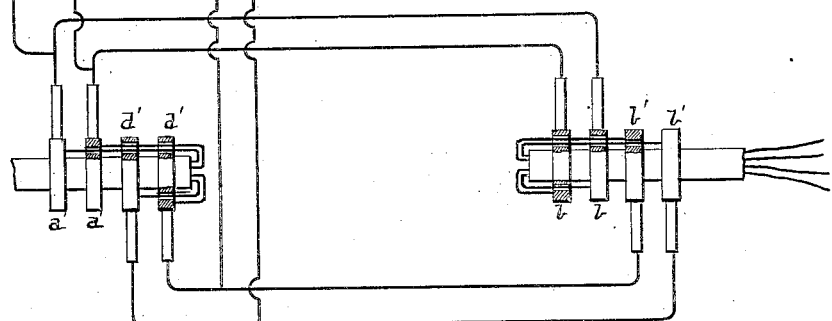
WITNESSES:
Frank E. Hartley.
Frank B. Murphy.
INVENTOR
Nikola Tesla,
BY
Duncan, Curtis & Page
ATTORNEYS.

UNITED STATES PATENT OFFICE.

NIKOLA TESLA, OF NEW YORK, N. Y., ASSIGNOR OF ONE-HALF TO CHARLES F. PECK, OF ENGLEWOOD, NEW JERSEY.

ELECTRO-MAGNETIC MOTOR.

SPECIFICATION forming part of Letters Patent No. 381,968, dated May 1, 1888.

Application filed October 12, 1887. Serial No. 252,132. (No model.)

*To all whom it may concern:*

Be it known that I, NIKOLA TESLA, from Smiljan Lika, border country of Austria-Hungary, residing at New York, N. Y., have invented certain new and useful Improvements in Electro-Magnetic Motors, of which the following is a specification, reference being had to the drawings accompanying and forming a part of the same.

The practical solution of the problem of the electrical conversion and transmission of mechanical energy involves certain requirements which the apparatus and systems heretofore employed have not been capable of fulfilling. Such a solution, primarily, demands a uniformity of speed in the motor irrespective of its load within its normal working limits. On the other hand, it is necessary, to attain a greater economy of conversion than has heretofore existed, to construct cheaper and more reliable and simple apparatus, and, lastly, the apparatus must be capable of easy management, and such that all danger from the use of currents of high tension, which are necessary to an economical transmission, may be avoided.

My present invention is directed to the production and improvement of apparatus capable of more nearly meeting these requirements than those heretofore available, and though I have described various means for the purpose, they involve the same main principles of construction and mode of operation, which may be described as follows: A motor is employed in which there are two or more independent circuits through which alternate currents are passed at proper intervals, in the manner hereinafter described, for the purpose of effecting a progressive shifting of the magnetism or of the "lines of force" in accordance with the well-known theory, and a consequent action of the motor. It is obvious that a proper progressive shifting of the lines of force may be utilized to set up a movement or rotation of either element of the motor, the armature, or the field-magnet, and that if the currents directed through the several circuits of the motor are in the proper direction no commutator for the motor will be required; but to avoid all the usual commutating appliances in the system I prefer to connect the motor-circuits directly with those of a suitable alternate-current generator. The practical results of such a system, its economical advantages, and the mode of its construction and operation will be described more in detail by reference to the accompanying diagrams and drawings.

Figures 1 to 8 and 1$^a$ to 8$^a$, inclusive, are diagrams illustrating the principle of the action of my invention. The remaining figures are views of the apparatus in various forms by means of which the invention may be carried into effect, and which will be described in their order.

Figure 9:
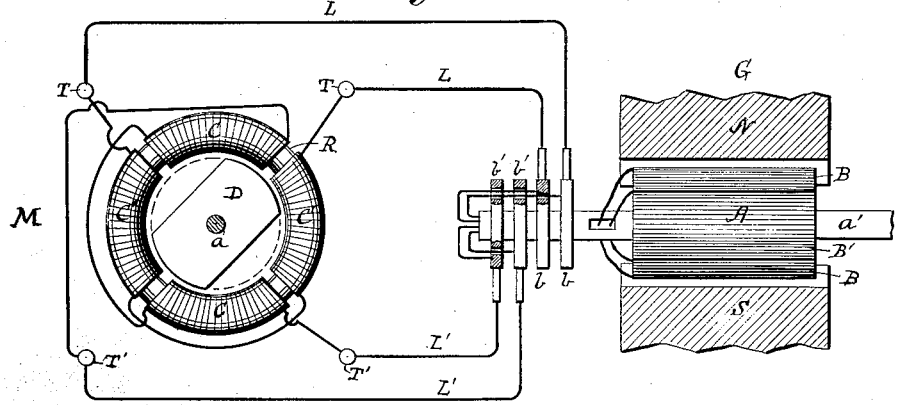

Referring first to Fig. 9, which is a diagrammatic representation of a motor, a generator, and connecting-circuits in accordance with my invention, M is the motor, and G the generator for driving it. The motor comprises a ring or annulus, R, preferably built up of thin insulated iron rings or annular plates, so as to be as susceptible as possible to variations in its magnetic condition. This ring is surrounded by four coils of insulated wire symmetrically placed, and designated by C C C' C'. The diametrically-opposite coils are connected up so as to co-operate in pairs in producing free poles on diametrically-opposite parts of the ring. The four free ends thus left are connected to terminals T T T' T', as indicated. Near the ring, and preferably inside of it, there is mounted on an axis or shaft, $a$, a magnetic disk, D, generally circular in shape, but having two segments cut away, as shown. This disk is mounted so as to turn freely within the ring R. The generator G is of any ordinary type, that shown in the present instance having field-magnets N S and a cylindrical armature-core, A, wound with the two coils B B'. The free ends of each coil are carried through the shaft $a'$ and connected, respectively, to insulated contact-rings $b$ $b$ $b'$ $b'$. Any convenient form of collector or brush bears on each ring and forms a terminal by which the current to and from a ring is conveyed. These terminals are connected to the terminals of the motor by the wires L and L' in the manner indicated, whereby two complete circuits are formed—one including, say, the coils B of the generator C' C' of the motor, and the other the remaining coils B' and C C of the generator and the motor.

It remains now to explain the mode of operation of this system, and for this purpose I refer to the diagrams, Figs. 1 to 8, and 1ª to 8ª, for an illustration of the various phases through which the coils of the generator pass when in operation, and the corresponding and resultant magnetic changes produced in the motor. The revolution of the armature of the generator between the field-magnets N S obviously produces in the coils B B' alternating currents, the intensity and direction of which depend upon well-known laws. In the position of the coils indicated in Fig. 1 the current in the coil B is practically *nil*, whereas the coil B' at the same time is developing its maximum current, and by the means indicated in the description of Fig. 9 the circuit including this coil B' may also include, say, the coils C C of the motor, Fig. 1ª. The result, with the proper connections, would be the magnetization of the ring R', the poles being on the line N S. The same order of connections being observed between the coil B and the coils C', the latter, when traversed by a current, tend to fix the poles at right angles to the line N S of Fig. 1ª. It results, therefore, that when the generator-coils have made one eighth of a revolution, reaching the position shown in Fig. 2, both pairs of coils C and C' will be traversed by currents and act in opposition, in so far as the location of the poles is concerned. The position of the poles will therefore be the resultant of the magnetizing forces of the coils—that is to say, it will advance along the ring to a position corresponding to one-eighth of the revolution of the armature of the generator. In Fig. 3 the armature of the generator has progressed to one-quarter of a revolution. At the point indicated the current in the coil B is maximum, while in B' it is *nil*, the latter coil being in its neutral position. The poles of the ring R in Fig. 3ª will, in consequence, be shifted to a position ninety degrees from that at the start, as shown. I have in like manner shown the conditions existing at each successive eighth of one revolution in the remaining figures. A short reference to these figures will suffice for an understanding of their significance. Figs. 4 and 4ª illustrate the conditions which exist when the generator-armature has completed three eighths of a revolution. Here both coils are generating current; but the coil B', having now entered the opposite field, is generating a current in the opposite direction, having the opposite magnetizing effect; hence the resultant pole will be on the line N S, as shown. In Fig. 5 one-half of one revolution of the armature of the generator has been completed, and the resulting magnetic condition of the ring is shown in Fig. 5ª. In this phase coil B is in the neutral position while coil B' is generating its maximum current, which is in the same direction as in Fig. 4. The poles will consequently be shifted through one half of the ring. In Fig. 6 the armature has completed five-eighths of a revolution. In this position coil B' develops a less powerful current, but in the same direction as before. The coil B, on the other hand, having entered a field of opposite polarity, generates a current of opposite direction. The resultant poles will therefore be in the line N S, Fig. 6ª, or, in other words, the poles of the ring will be shifted along five-eighths of its periphery. Figs. 7 and 7ª in the same manner illustrate the phases of the generator and ring at three-quarters of a revolution, and Figs. 8 and 8ª the same at seven-eighths of a revolution of the generator-armature. These figures will be readily understood from the foregoing. When a complete revolution is accomplished, the conditions existing at the start are re-established and the same action is repeated for the next and all subsequent revolutions, and, in general, it will now be seen that every revolution of the armature of the generator produces a corresponding shifting of the poles or lines of force around the ring. This effect I utilize in producing the rotation of a body or armature in a variety of ways—for example, applying the principle above described to the apparatus shown in Fig. 9. The disk D, owing to its tendency to assume that position in which it embraces the greatest possible number of the magnetic lines, is set in rotation, following the motion of the lines or the points of greatest attraction.

The disk D in Fig. 9 is shown as cut away on opposite sides; but this, I have found, is not essential to effecting its rotation, as a circular disk, as indicated by dotted lines, is also set in rotation. This phenomenon I attribute to a certain inertia or resistance inherent in the metal to the rapid shifting of the lines of force through the same, which results in a continuous tangential pull upon the disk, causing its rotation. This seems to be confirmed by the fact that a circular disk of steel is more effectively rotated than one of soft iron, for the reason that the former is assumed to possess a greater resistance to the shifting of the magnetic lines.

In illustration of other forms of my invention, I shall now describe the remaining figures of the drawings.

Figure 10:
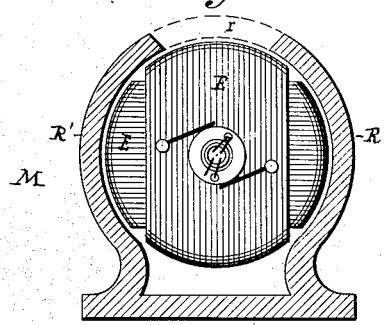
Figure 11:
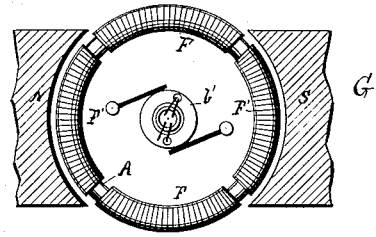
Figure 12:
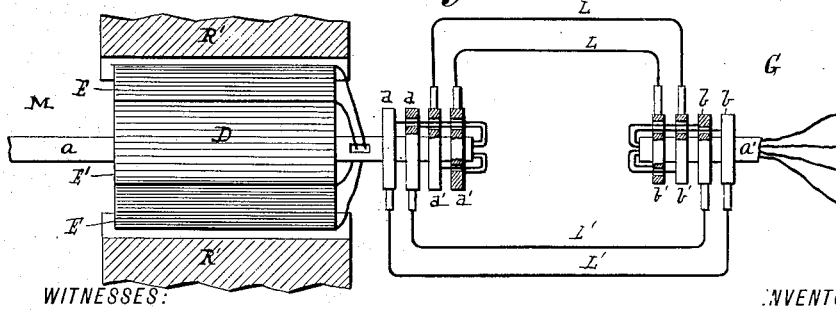

Fig. 10 is a view in elevation and part vertical section of a motor. Fig. 12 is a top view of the same with the field in section and a diagram of connections. Fig. 11 is an end or side view of a generator with the fields in section. This form of motor may be used in place of that shown above. D is a cylindrical or drum-armature core, which, for obvious reasons, should be split up as far as practicable to prevent the circulation within it of currents of induction. The core is wound longitudinally with two coils, E and E', the ends of which are respectively connected to insulated contact-rings $d\ d\ d'\ d'$, carried by the shaft $a$, upon which the armature is mounted. The armature is set to revolve within an iron shell, R', which constitutes the field-magnet, or other element of the motor. This shell is preferably formed with a slot or opening, r, but it may be continuous, as shown by the dotted lines, and in this event it is preferably made of steel. It is also desirable that this shell should be divided up similarly to the armature and for similar reasons. As a generator for driving this motor I may use the device shown in Fig. 11. This represents an annular or ring armature, A, surrounded by four coils, F F F' F', of which those diametrically opposite are connected in series, so that four free ends are left, which are connected to the insulated contact-rings b b b' b'. The ring is suitably mounted on a shaft, a', between the poles N S. The contact-rings of each pair of generator-coils are connected to these of the motor, respectively, by means of contact-brushes and the two pairs of conductors L L and L' L', as indicated diagrammatically in Fig. 12. Now it is obvious from a consideration of the preceding figures that the rotation of the generator-ring produces currents in the coils F F', which, being transmitted to the motor-coils, impart to the core of the latter magnetic poles constantly shifting or whirling around the core. This effect sets up a rotation of the armature owing to the attractive force between the shell and the poles of the armature, but inasmuch as the coils in this case move relative to the shell or field-magnet the movement of the coils is in the opposite direction to the progressive shifting of the poles.

Other arrangements of the coils of both generator and motor are possible, and a greater number of circuits may be used, as will be seen in the two succeeding figures.

Fig. 13 is a diagrammatic illustration of a motor and a generator constructed and connected in accordance with my invention. Fig. 14 is an end view of the generator with its field-magnets in section. The field of the motor M is produced by six magnetic poles, G' G', secured to or projecting from a ring or frame, H. These magnets or poles are wound with insulated coils, those diametrically opposite to each other being connected in pairs so as to produce opposite poles in each pair. This leaves six free ends, which are connected to the terminals T T T' T' T'' T''. The armature, which is mounted to rotate between the poles, is a cylinder or disk, D, of wrought-iron, mounted on the shaft a. Two segments of the same are cut away, as shown. The generator for this motor has in this instance an armature, A, wound with three coils, K K' K'', at sixty degrees apart. The ends of these coils are connected, respectively, to insulated contact-rings e e e' e' e'' e''. These rings are connected to those of the motor in proper order by means of collecting-brushes and six wires, forming three independent circuits. The variations in the strength and direction of the currents transmitted through these circuits and traversing the coils of the motor produce a steadily-progressive shifting of the resultant attractive force exerted by the poles G' upon the armature D, and consequently keep the armature rapidly rotating. The peculiar advantage of this disposition is in obtaining a more concentrated and powerful field. The application of this principle to systems involving multiple circuits generally will be understood from this apparatus.

Referring, now, to Figs. 15 and 16, Fig. 15 is a diagrammatic representation of a modified disposition of my invention. Fig. 16 is a horizontal cross-section of the motor. In this case a disk, D, of magnetic metal, preferably cut away at opposite edges, as shown in dotted lines in Fig. 15, is mounted so as to turn freely inside two stationary coils, N' N'', placed at right angles to one another. The coils are preferably wound on a frame, O, of insulating material, and their ends are connected to the fixed terminals T T T' T'. The generator G is a representative of that class of alternating-current machines in which a stationary induced element is employed. That shown consists of a revolving permanent or electro magnet, A, and four independent stationary magnets, P P', wound with coils, those diametrically opposite to each other being connected in series and having their ends secured to the terminals t t t' t'. From these terminals the currents are led to the terminals of the motor, as shown in the drawings. The mode of operation is substantially the same as in the previous cases, the currents traversing the coils of the motor having the effect to turn the disk D. This mode of carrying out the invention has the advantage of dispensing with the sliding contacts in the system.

In the forms of motor above described only one of the elements, the armature or the field-magnet, is provided with energizing-coils. It remains, then, to show how both elements may be wound with coils. Reference is therefore had to Figs. 17, 18, and 19. Fig. 17 is an end view of such a motor. Fig. 18 is a similar view of the generator with the field-magnets in section, and Fig. 19 is a diagram of the circuit-connections. In Fig. 17 the field-magnet of the motor consists of a ring, R, preferably of thin insulated iron sheets or bands with eight pole pieces, G', and corresponding recesses, in which four pairs of coils, V, are wound. The diametrically opposite pairs of coils are connected in series and the free ends connected to four terminals, w, the rule to be followed in connecting being the same as hereinbefore explained. An armature, D, with two coils, E E', at right angles to each other, is mounted to rotate inside of the field-magnet R. The ends of the armature-coils are connected to two pairs of contact-rings, d d d' d', Fig. 19. The generator for this motor may be of any suitable kind to produce currents of the desired character. In the present instance it consists of a field-magnet, N S, and an armature, A, with two coils at right angles, the ends of which are connected to four contact-rings, b b b' b', carried by its shaft. The circuit-connections are established between the rings on the generator-shaft and those on the motor-shaft by collecting brushes and wires, as previously explained. In order to properly energize the field-magnet of the motor, however, the connections are so made with the armature coils or wires leading thereto that while the points of greatest attraction or greatest density of magnetic lines of force upon the armature are shifted in one direction those upon the field-magnet are made to progress in an opposite direction. In other respects the operation is identically the same as in the other cases cited. This arrangement results in an increased speed of rotation. In Figs. 17 and 19, for example, the terminals of each set of field-coils are connected with the wires to the two armature-coils in such way that the field-coils will maintain opposite poles in advance of the poles of the armature.

In the drawings the field-coils are in shunts to the armature, but they may be in series or in independent circuits.

It is obvious that the same principle may be applied to the various typical forms of motor hereinbefore described.

Having now described the nature of my invention and some of the various ways in which it is or may be carried into effect, I would call attention to certain characteristics which the applications of the invention possess and the advantages which the invention secures.

In my motor, considering for convenience that represented in Fig. 9, it will be observed that since the disk D has a tendency to follow continuously the points of greatest attraction, and since these points are shifted around the ring once for each revolution of the armature of the generator, it follows that the movement of the disk D will be synchronous with that of the armature A. This feature by practical demonstrations I have found to exist in all other forms in which one revolution of the armature of the generator produces a shifting of the poles of the motor through three hundred and sixty degrees.

In the particular construction shown in Fig. 15, or in others constructed on a similar plan, the number of alternating impulses resulting from one revolution of the generator armature is double as compared with the preceding cases, and the polarities in the motor are shifted around twice by one revolution of the generator-armature. The speed of the motor will, therefore, be twice that of the generator. The same result is evidently obtained by such a disposition as that shown in Fig. 17, where the poles of both elements are shifted in opposite directions.

Again, considering the apparatus illustrated by Fig. 9 as typical of the invention, it is obvious that since the attractive effect upon the disk D is greatest when the disk is in its proper relative position to the poles developed in the ring R—that is to say, when its ends or poles immediately follow those of the ring—the speed of the motor for all the loads within the normal working limits of the motor will be practically constant. It is clearly apparent that the speed can never exceed the arbitrary limit as determined by the generator, and also that within certain limits at least the speed of the motor will be independent of the strength of the current.

It will now be more readily seen from the above description how far the requirements of a practical system of electrical transmission of power are realized in my invention. I secure, first, a uniform speed under all loads within the normal working limits of the motor without the use of any auxiliary regulator; second, synchronism between the motor and generator; third, greater efficiency by the more direct application of the current, no commutating devices being required on either the motor or generator; fourth, cheapness and simplicity of mechanical construction and economy in maintenance; fifth, the capability of being very easily managed or controlled; and, sixth, diminution of danger from injury to persons and apparatus.

These motors may be run in series, multiple arc or multiple series, under conditions well understood by those skilled in the art.

The means or devices for carrying out the principle may be varied to a far greater extent than I have been able to indicate; but I regard as within my invention, and I desire to secure by Letters Patent in general, motors containing two or more independent circuits through which the operating-currents are led in the manner described. By "independent" I do not mean to imply that the circuits are necessarily isolated from one another, for in some instances there might be electrical connections between them to regulate or modify the action of the motor without necessarily producing a new or different action.

I am aware that the rotation of the armature of a motor wound with two energizing-coils at right angles to each other has been effected by an intermittent shifting of the energizing effect of both coils through which a direct current by means of mechanical devices has been transmitted in alternately-opposite directions; but this method or plan I regard as absolutely impracticable for the purposes for which my invention is designed—at least on any extended scale—for the reasons, mainly, that a great waste of energy is necessarily involved unless the number of energizing-circuits is very great, and that the interruption and reversal of a current of any considerable strength by means of any known mechanical devices is a matter of the greatest difficulty and expense.

In this application I do not claim the method of operating motors which is herein involved, having made separate application for such method.

I therefore claim the following:

1. The combination, with a motor containing separate or independent circuits on the armature or field-magnet, or both, of an alternating-current generator containing induced circuits connected independently to corresponding circuits in the motor, whereby a rotation of the generator produces a progressive shifting of the poles of the motor, as herein described.

2. In a system for the electrical transmission of power, the combination of a motor provided with two or more independent magnetizing-coils and an alternating-current generator containing induced coils corresponding to the motor-coils, and circuits connecting directly the motor and generator coils in such order that the currents developed by the generator will be passed through the corresponding motor-coils, and thereby produce a progressive shifting of the poles of the motor, as herein set forth.

3. The combination, with a motor having an annular or ring-shaped field-magnet and a cylindrical or equivalent armature, and independent coils on the field-magnet or armature, or both, of an alternating-current generator having correspondingly independent coils, and circuits including the generator-coils and corresponding motor-coils in such manner that the rotation of the generator causes a progressive shifting of the poles of the motor in the manner set forth.

4. In a system for the electrical transmission of power, the combination of the following instrumentalities, to wit: a motor composed of a disk or its equivalent mounted within a ring or annular field-magnet, which is provided with magnetizing-coils connected in diametrically-opposite pairs or groups to independent terminals, a generator having induced coils or groups of coils equal in number to the pairs or groups of motor-coils, and circuits connecting the terminals of said coils to the terminals of the motor, respectively, and in such order that the rotation of the generator and the consequent production of alternating currents in the respective circuits produces a progressive shifting of the poles of the motor, as hereinbefore described.

NIKOLA TESLA.

Witnesses:
FRANK E. HARTLEY,
FRANK B. MURPHY.